United States Patent
Nakao et al.

Patent Number: 5,409,994
Date of Patent: Apr. 25, 1995

[54] AUTOMOTIVE TOP COATING COMPOSITION

[75] Inventors: Yasushi Nakao; Toru Ozaki; Mitsuhiro Fukuda, all of Hiratsuka; Motoshi Yabuta, Hadano, all of Japan

[73] Assignee: Kansai Paint Company, Limited, Amagasaki, Japan

[21] Appl. No.: 118,290

[22] Filed: Sep. 9, 1993

Related U.S. Application Data

[63] Continuation of Ser. No. 778,209, Dec. 23, 1991, abandoned.

[30] Foreign Application Priority Data

Apr. 25, 1990 [JP] Japan .................. 2-111042

[51] Int. Cl.⁶ .................. C09D 133/14; C09D 161/28; C09D 125/18
[52] U.S. Cl. .................. 525/160; 525/101; 525/209
[58] Field of Search .................. 525/160, 101, 209

[56] References Cited

U.S. PATENT DOCUMENTS

| | | | |
|---|---|---|---|
| 4,288,357 | 9/1981 | Kanazawa et al. | 524/720 |
| 4,320,172 | 3/1982 | Takamizawa et al. | 428/447 |
| 5,063,114 | 11/1991 | Nambu et al. | 428/447 |
| 5,100,962 | 3/1992 | Sawada et al. | 525/125 |

FOREIGN PATENT DOCUMENTS

| | | |
|---|---|---|
| 61-258811 | 11/1986 | Japan . |
| 62-156172 | 7/1987 | Japan . |
| 63-039969 | 2/1988 | Japan . |
| 2-091168 | 3/1990 | Japan . |
| 1171012 | 11/1969 | United Kingdom . |

*Primary Examiner*—Ralph H. Dean
*Attorney, Agent, or Firm*—Armstrong, Westerman, Hattori, McLeland & Naughton

[57] ABSTRACT

The invention provides an automotive top coating composition, comprising as the main components;: (A) an acrylic polymer prepared by copolymerizing 5 to 40% by weight of an alkoxysilane-containing vinyl monomer which is a compound represented by the formula

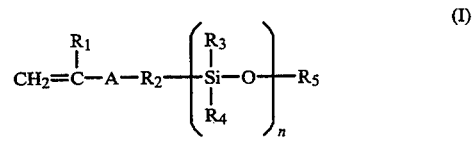

wherein A is

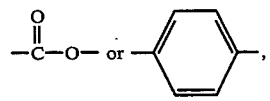

$R_1$ is a hydrogen atom or a methyl group, $R_2$ is a bivalent aliphatic saturated hydrocarbon group having 1 to 6 carbon atoms, $R_3$ and $R_4$ are the same or different and are each a phenyl group, an alkyl group having 1 to 6 carbon atoms or an alkoxy group having 1 to 10 carbon atoms, $R_4$ is an alkyl group having 1 to 10 carbon atoms, and n is an integer of 1 to 100, 5 to 50% by weight of a hydroxyl-containing vinyl monomer and 10 to 90% by weight of a vinyl monomer which is copolymerizable with the above vinyl monomers, and (B) an amino resin in an amount of 5 to 50% by weight based on the total amount of resin solids in the coating composition.

3 Claims, No Drawings

AUTOMOTIVE TOP COATING COMPOSITION

This application is a continuation of application Ser. No. 07/778,209 filed Dec. 23, 1991, abandoned.

FIELD OF THE INVENTION

The present invention relates to a novel automotive top coating composition which is capable of forming a coating excellent in the resistance to acids and scratches.

BACKGROUND ART

Among the important properties of top coating compositions for an automotive top is a capability of forming a coating with top appearance outstanding in the surface smoothness, gloss, distinctness-of-image gloss, etc. Coatings excellent in the top appearance, weatherability, physical properties, etc. can be formed from automotive top coating compositions currently used which comprise a hydroxyl-containing acrylic resin and an amino resin as main components. However, the obtained coatings have the drawback of readily deteriorating in the surface due to acid rain (pH 4 or less) which has recently become a social issue. In the foregoing situation, there has been a great need in recent years for development of top coating compositions which form coatings having a high acid resistance.

DISCLOSURE OF THE INVENTION

An object of the present invention is to provide a novel automotive top coating composition which is free of the foregoing drawback of conventional techniques.

Another object of the invention is to provide a novel automotive top coating composition which is capable of forming a coating having an acid resistance remakably improved without impairing the top appearance or diminishing the weatherability or the physical properties.

These and other objects of the invention will become more apparent from the following description.

According to the invention, there is provided an automotive top coating composition, comprising as the main components: (A) an acrylic polymer prepared by copolymerizing 5 to 40% by weight of an alkoxysilane-containing vinyl monomer which is a compound represented by the formula

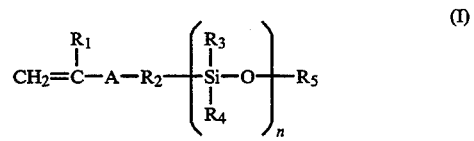 (I)

wherein A is

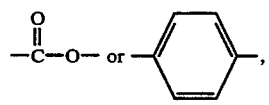

$R_1$ is a hydrogen atom or a methyl group, $R_2$ is a bivalent aliphatic saturated hydrocarbon group having 1 to 6 carbon atoms, $R_3$ and $R_4$ are the same or different and are each a phenyl group, an alkyl group having 1 to 6 carbon atoms or an alkoxy group having 1 to 10 carbon atoms, $R_5$ is an alkyl group having 1 to 10 carbon atoms, and n is an integer of 1 to 100, 5 to 50% by weight of a hydroxyl-containing vinyl monomer and 10 to 90% by weight of a vinyl monomer which is copolymerizable with the above vinyl monomers, and (B) an amino resin in an amount of 5 to 50% by weight based on the total amount of resin solids in the coating composition.

The present inventors investigated the glass transition temperature (Tg point), molecular weight, styrene content and other properties of acrylic resins conventionally used as the base resin curable with an amino resin in order to improve the acid resistance of a cured coating. Consequently the inventors' investigation resulted in formation of a coating with a slightly improved acid resistance which, however, was not significantly different from the level of conventional top coatings. In other words, the coating thus formed failed to essentially obviate the problem in the current situations of motor vehicles.

The inventors' further research revealed the following. It was assumed that the surface of conventional coatings cured with an amino resin is deteriorated due to acids essentially because there readily hydrolyzes an ether linkage formed by the crosslinking reaction between the methylol group directly attached to the nitrogen atom in the amino resin and the hydroxyl group in the acrylic resin. Based on this assumption, the inventors found that the acid resistance of a cured coating can be pronouncedly improved by introducing —SiOSi— or —SiOR— which is a scarcely hydrolyzable chemical linkage in crosslinking.

The present invention has been accomplished based on this novel finding.

The coating composition of the present invention will be described below in greater detail.

(A) Acrylic Polymer

The acrylic polymer is prepared by copolymerizing 5 to 40% by weight of an alkoxysilane-containing vinyl monomer which is a compound represented by the formula

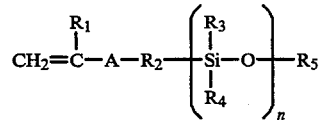 (I)

wherein A is

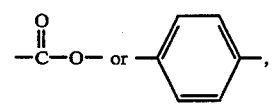

$R_1$ is a hydrogen atom or a methyl group, $R_2$ is a blvalent aliphatic saturated hydrocarbon group having 1 to 6 carbon atoms, $R_3$ and $R_4$ are the same or different and are each a phenyl group, an alkyl group having 1 to 6 carbon atoms or an alkoxy group having 1 to 10 carbon atoms, $R_5$ is an alkyl group having 1 to 10 carbon atoms, and n is an integer of 1 to 100, 5 to 50% by weight of a hydroxyl-containing vinyl monomer and 10 to 90% by weight of a vinyl monomer which is copolymerizable with the above vinyl monomers.

In the compound of the formula (I) which is one of the essential monomers of the acrylic polymer, n is preferably 1 to 10.

Examples of the bivalent aliphatic saturated hydrocarbon group of 1 to 6 carbon atoms represented by $R_2$ in the formula (I) are straight- or branched-chain alkylene groups such as methylene, ethylene, propylene, 1,2-butylene, 1,3-butylene, 2,3-butylene, tetramethylene, ethylethylene, pentamethylene, hexamethylene, etc. Examples of the alkyl group of 1 to 6 carbon atoms represented by $R_3$ and $R_4$ are straight- or branched-chain alkyl groups such as methyl, ethyl, n-propyl, isopropyl, n-butyl, isobutyl, sec-butyl, tert-butyl, n-pentyl, isopentyl, neopentyl, n-hexyl, isohexyl, etc. Examples of the alkyl group of 1 to 10 carbon atoms represented by $R_5$ include not only such groups but n-heptyl, 1-methylpentyl, 2-methylhexyl, n-octyl, n-nonyl, n-decyl, etc. Examples of the alkoxy group of 1 to 10 carbon atoms represented by $R_3$ and $R_4$ are straight- or branched-chain alkoxy groups such as methoxy, ethoxy, n-propoxy, isopropoxy, n-butoxy, isobutoxy, sec-butoxy, tert-butoxy, n-pentoxy, isopentoxy, n-hexyloxy, isohexyloxy, n-octyloxy, etc. When n is 2 or more, the $R_3$ groups or $R_4$ groups may be the same or different.

Of the compounds of the formula (I) in the present invention, those wherein A is

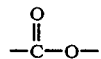

are, for example, λ-(meth)acryloxyethyltrimethoxysilane, λ-(meth)acryloxypropyltrimethoxysilane, λ-(meth)acryloxypropyltriethoxysilane, λ-(meth)acryloxypropyltripropoxysilane, λ-(meth)acryloxypropylmethyldimethoxysilane, λ-(meth)acryloxypropylmethyldiethoxysilane, λ-(meth)acryloxypropylmethyldipropoxysilane, λ-(meth)acryloxybutylphenyldimethoxysilane, λ-(meth)acryloxybutylphenyldiethoxysilane, λ-(meth)acryloxybutylphenyldipropoxysilane, λ-(meth)acryloxypropyldimethylmethoxysilane, λ-(meth)acryloxypropyldimethylethoxysilane, λ-(meth)acryloxypropylphenylmethylmethoxysilane, λ-(meth)acryloxypropylphenylmethylethoxysilane,

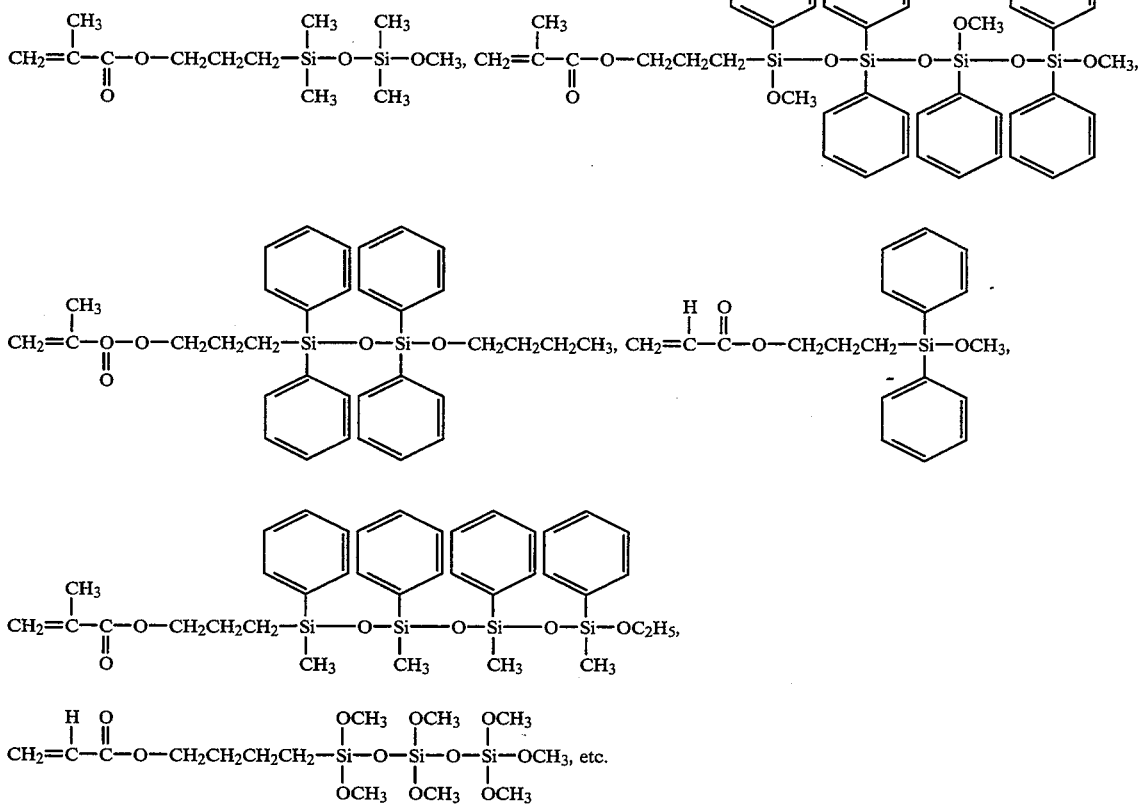

Of the compounds of the formula (I), those wherein A is  are, for example,

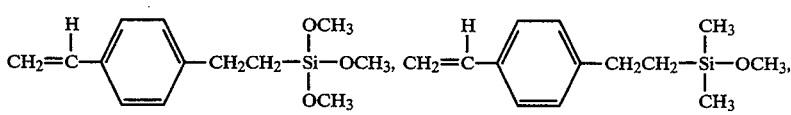

-continued

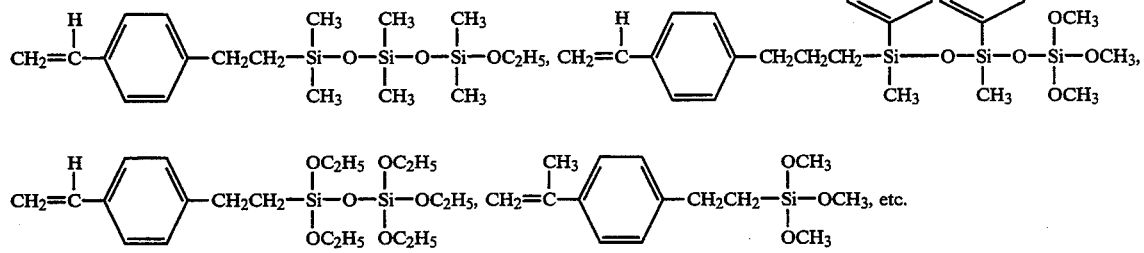

Of the compounds of the formula (I), preferred are acryloxypropyltrimethoxysilane, methacryloxypropyltriethoxysilane, methacryloxypropyltri-n-butoxysilane, acryloxypropylmethyldimethoxysilane, methacryloxypropylmethyldimethoxysilane, methacryloxypropylmethyl-di-n-butoxysilane, etc.

Examples of the hydroxyl-containing vinyl monomer for use as another essential component in the polymer are 2-hydroxyethyl acrylate, 2-hydroxyethyl methacrylate, hydroxypropyl (meth)acrylate, butanediol monoacrylate, "PLACCEL FM-1", "PLACCELFM-2", "PLACCEL FM-3", "PLACCEL FA-1", "PLACCEL FA-2" and "PLACCEL FA-3" (trademarks, caprolactone-modified 2-hydroxyethyl (meth)acrylates manufactured by Daicel Chemical Industries, Ltd.) to which useful monomers are not limited.

Examples of the vinyl monomer copolymerizable with the alkoxysilane-containing vinyl monomer and hydroxyl-containing vinyl monomer are compounds which have one polymerizable unsaturated linkage per molecule and which include esters of (meth)acrylic acids with monohydric alcohols of 1 to 22 carbon atoms, such as methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, lauryl acrylate, lauryl methacrylate, stearyl acrylate, stearyl methacrylate and the like; carboxyl-containing vinyl monomers such as acrylic acid, methacrylic acid, maleic anhydride and the like; glycidyl-containing vinyl monomers such as glycidyl acrylate, glycidyl methacrylate and the like; amide-type vinyl monomers such as acrylamide, methacrylamide, N-methylolacrylamide, N-methylolmethacrylamide and the like; amine-type vinyl monomers such as dimethylaminoethyl methacrylate, 2-diethylaminoethyl methacrylate, tert-butylaminoethyl methacrylate and the like; and other vinyl monomers such as styrene, vinyl toluene, acrylonitrile, methacrylonitrile, α-methylstyrene, vinyl acetate and the like.

The amount of the alkoxysilane-containing vinyl monomer to be copolymerized is 5 to 40% by weight, preferably 5 to 30% by weight. The amount of less than 5% by weight used impairs the acid resistance of the cured coating, whereas the amount of more than 40% by weight used reduces the storage stability of the coating composition. The amount of the hydroxyl-containing vinyl monomer to be copolymerized is 5 to 50% by weight, preferably 10 to 40% by weight. The amount of less than 5% by weight used hinders smooth progress of reaction of the amino resin with the alkoxysilane and hydroxyl groups and impairs the curability and the acid resistance, whereas the amount of more than 50% by weight diminishes the water resistance.

The copolymerization of the alkoxysilane-containing vinyl monomer, hydroxyl-containing vinyl monomer and other vinyl monomer can be conducted in the same manner as in the conventional method for synthesis of acrylic resin, vinyl resin or the like, as by dissolving or dispersing the monomers in an organic solvent and heating the solution or the dispersion at a temperature of about 60° to about 180° C. with stirring in the presence of a radical polymerization initiator. The reaction time is usually about 1 to about 10 hours.

Useful organic solvents are hydrocarbon solvents such as heptane, toluene, xylene, octane, mineral spirit and the like; ester solvents such as ethyl acetate, n-butyl acetate, isobutyl acetate, methyl cellosolve acetate, butylcarbitol acetate and the like; ketone solvents such as methyl ethyl ketone, methyl isobutyl ketone, diisobutyl ketone and the like; alcohol solvents such as ethanol, isopropanol, n-butanol, sec-butanol, isobutanol and the like; and ether solvents such as n-butyl ether, dioxane, ethylene glycol monomethyl ether, ethylene glycol monoethyl ether and the like. Of these solvents, the hydrocarbon solvent is used preferably in mixture with other solvents to increase the dissolving power.

Useful radical polymerization initiators can be any of those conventionally used such as benzoyl peroxide, tert-butylperoxy-2-ethylhexanoate and like peroxides, azoisobutyronitrile, azobisdimethylvaleronitrilte and like azo compounds.

The acrylic polymer has a number average molecular weight of about 3,000 to about 500,000, preferably about 5,000 to about 100,000.

The acrylic polymer for use as the component (A) in the invention is prepared by copolymerizing, as described above, the alkoxysilane-containing vinyl monomer which is the compound of the formula (I), the hydroxyl-containing vinyl monomer and the other vinyl monomer. The obtained polymer has the alkoxysilane group and the hydroxyl group attached as the side chain. Thus the acrylic polymer used as the base resin curable with an amino resin gives a cured coating which is superior in the surface properties (acid resistance, water repellency and resistance to scratches, water, chemicals, weather and heat) and particularly in the acid resistance to amino resin-curable acrylic resins conventionally used as the base resin, because the acrylic polymer has the alkoxysilane group which can introduce, in crosslinking, —SiOSi— or —SiOR— which is a scarcely hydrolyzable chemical linkage.

(B) Amino resin

Amino resins useful in the invention include conventional partially or completely mentholated amino resins produced by the reaction of an aldehyde and an amino component such as melamine, urea, benzoguanamine, acetoguanamine, steroguanamine, spiroguanamine, dicyandiamide or the like. Useful aldehydes include formaldehyde, paraformaldehyde, acetoaldehyde, benzaldehyde, etc. Also usable are these methylolated amino resins etherified with a suitable alcohol. Alcohols useful for etherification are methyl alcohol, ethyl alcohol,, n-propyl alcohol, isopropyl alcohol, n-butyl alcohol, isobutyl alcohol, 2-ethylbutanol, 2-ethylhexanol, etc. It is desirable in the invention to use hexamethoxymethyl melamine or an etherified melamine resin having the methoxy groups partially or wholly replaced by an alcohol of 4 or more carbon atoms. In this case, it is preferred to add a conventional curing catalyst such as p-toluenesulronic acid, dodecylbenzenesulfonic acid or the like.

Usable as the component (B) in the present invention are those commercially available under Cymel 303 (trademark, fully methoxylated melamine resin manufactured by Mitsui-Cyanamid, Ltd.), U-VAN 20SE-60 (trademark, butylated melamine resin manufactured by Mitsui Toatsu Chemicals Inc.), etc.

The coating composition of the invention comprises the components (A) and (B) as the main components. The mixing ratio of these components is optionally selected according to a specific object. The amount of the component (A) used is 50 to 95% by weight, preferably 55 to 90% by weight, more preferably 60 to 80% by weight, based on the total amount of the resin solids in the coating composition. The amount of the component (B) used is 5 to 50% by weight, preferably 10 to 45% by weight, more preferably 20 to 40% by weight, based on the total amount of the resin solids in the coating composition. Less than 5% by weight of the component (B) used markedly reduces the resistance to water and weather, whereas more than 50% by weight thereof used significantly deteriorates the mechanical properties and the interlaminar adhesion in layered coatings.

The coating composition of the invention may contain a component (C) in addition to the components (A) and (B) used as the main components. The component (C) is a nonaqueous particulate polymer prepared by nonaqueous dispersion polymerization using a specific alkoxysilane-containing polymer as a dispersion stabilizer resin. The component (C) used even in a small amount imparts a low viscosity and high solids to a coating composition, remarkably improves the coating efficiency and provides a coating with further enhanced resistance to acids and impact. In other words, the addition of the component (C) was found to produce surprisingly remarkable effects.

The nonaqueous particulate polymer serving as the component (C) is prepared by polymerizing a radically polymerizable unsaturated monomer or monomers in an organic liquid, wherein the resulting polymer is insoluble, in the presence of the dispersion stabilizer resin which is a copolymer prepared from the alkoxysilane-containing vinyl monomer which is the compound of the formula (I), and a hydroxyl-containing unsaturated monomer, both used as essential monomer components.

The copolymer which is used as the dispersion stabilizer resin in the preparation of the component (C) is prepared from at least one of the alkoxysilane-containing vinyl monomers of the formula (I) and at least one of the hydroxyl-containing unsaturated monomers, both used as the essential monomer components. The proportions of these essential monomer components are selectable from a wide range. Usually it is suitable to use about 1 to about 99% by weight, preferably about 5 to about 30% by weight, of the monomer of the formula (I), and about 1 to about 99% by weight, preferably about 3 to about 30% by weight, of the hydroxyl-containing unsaturated monomer, based on the total monomers used.

The hydroxyl-containing unsaturated monomer which is the other essential monomer of the above-specified copolymer for use as the dispersion stabilizer resin in the preparation of the component (C) increases the hydrophilic property of the copolymer to accelerate the hydrolysis of alkoxysilane group derived from the compound of the formula (I), and the hydroxyl group derived from the monomer acts as the functional group which reacts with the amino resin, the component (B), serving as the curing agent for the crosslinking reaction.

Preferred examples of the hydroxyl-containing unsaturated monomer are $C_{2-8}$ hydroxyalkyl esters of (meth)acrylic acids such as 2-hydroxyethyl (meth)acrylate, 2-hydroxypropyl (meth)acrylate, 3-hydroxypropyl (meth)acrylate, hydroxybutyl (meth)acrylate and the like; monoesters of (meth)acrylic acids or like unsaturated carboxylic acids with polyether polyols such as polyethylene glycol, polypropylene glycol, polybutylene glycol or the like; monoethers of said $C_{2-8}$ hydroxyalkyl esters of (meth)acrylic acids with said polyether polyols; adducts of said $C_{2-8}$ hydroxyalkyl esters of (meth)acrylic acids with lactones such as $\epsilon$-caprolactone, $\gamma$-valerolactcne or the like; adducts of (meth)acrylic acid or like $\alpha,\beta$-unsaturated carboxylic acids with monoepoxy compounds such as "Cardura E-10" (trademark, glycidyl ester of versatic acid composition manufactured by Shell Chemicals Ltd.) or ethylene oxide, propylene oxide, butylene oxide or like $\alpha$-olefin epoxides; adducts of glycidyl (meth)acrlates with monobasic acids such as acetic acid, propionic acid, p-tertbutylbenzoic acid, lauric acid, stearic acid or like fatty acids; monoesters or diesters of acid anhydride group-containing unsaturated compounds such as maleic anhydride, itaconic anhydride or the like with glycols such as ethylene glycol, 1,6-hexanediol, neopentyl glycol or the like; hydroxyethyl vinyl ether and like hydroxyalkyl vinyl ethers; 3-chloro-2-hydroxypropyl (meth)acrylate and like chlorine-containing compounds; etc.

In the preparation of the copolymer, other copolymerizable monomers may be optionally used. It is preferred to use long-chain vinyl monomers as such monomers in view of the copolymerizability and the solubility in organic liquids. Preferred examples of such monomers are $C_{4-8}$ alkyl or cycloalkyl esters of (meth)acrylic acids such as n-butyl (meth) acrylate, isobutyl (meth) acrylate, tert-butyl (meth) acrylate, 2-ethylhexyl (meth) acrylate, cyclohexyl (meth) acrylate, n-octyl (meth) acrylate, lauryl (meth)acrylate, tridecyl (meth)acrylate, stearyl (meth)acrylate, cyclohexyl (meth) acrylate and the like; alkoxyalkyl esters of (meth)acrylic acids such as methoxybutyl (meth)acrylate, methoxyethyl (meth)acrylate, ethoxybutyl (meth)acrylate and the like; esters of aromatic alcohols with (meth)acrylic acids such as benzyl (meth)acrylate; adducts of glycidyl (meth)acrylates or hydroxy alkyl esters of (meth)acrylic acids with monocarboxylic acid compounds such as capric acid, lauric acid, linoleic acid, oleic acid or the like; adducts of (meth)acrylic acids with monoepoxy compounds such as "Cardura E-10" (trademark); monoesters or diesters of α,β-unsaturated carboxylic acids other than (meth)acrylic acids such as itaconic acid, itaconic anhydride, crotonic acid, maleic acid, maleic anhydride, fumaric acid, citraconic acid or the like with $C_{4-18}$ monohydric alcohols such as butyl alcohol, pentyl alcohol, heptyl alcohol, octyl alcohol, stearyl alcohol or the like; and fluorine-containing compounds such as "VISCOAT 8F", "VISCOAT 8FM", "VISCOAT 3F" and "VISCOAT 3FM" (trademarks, (meth)acrylates with fluorine atoms in the side chain manufactured by Osaka Organic Chemical Industry Ltd.), perfluorocyclohexyl (meth)acrylate, perfluorohexyl ethylene, etc.

A radical polymerization initiator is usually used in the copolymerization for preparing the dispersion stabilizer resin to be used in preparing the component (C). Usable radical polymerization initiators are 2,2′-azobisisobutyronitrile, 2,2′-azobis(2,4-dimethylvaleronitrile) and like azo-type initiators, benzoyl peroxide, lauryl peroxide, tert-butyl peroctoate, tert-butylperoxy-2-ethylhexanoate and like peroxides, etc. These polymerization initiators are used in an amount of about 0.2 to about 10 parts by weight, preferably about 0.5 to about 5 parts by weight, per 100 parts by weight of the monomers to be copolymerized. A suitable reaction temperature in the copolymerization is about 60° to about 160° C. The reaction is completed in about 1 to about 15 hours.

It is suitable that the copolymer for use as the dispersion stabilizer resin in the preparation of the component (C) have a weight average molecular weight of about 5,000 to about 100,000 (number average molecular weight of about 1,000 to about 60,000), preferably about 5,000 to about 50,000. The copolymer of less than about 5,000 in molecular weight results in insufficient stability of dispersed particles, tending to cause agglomeration and sedimentation, whereas the copolymer of more than about 100,000 in molecular weight markedly increases the viscosity, possibly entailing difficulty of handling. Hence the copolymer of molecular weight outside the above range is undesirable.

In the preparation of the component (C), the dispersion stabilzer resin may be used singly or as a mixture of two or more species different from one another in the composition or the molecular weight of the resin. When required, the resin may be used in mixture with a small amount of another dispersion stabilizer, such as butyl etherified melamine-formaldehyde resins, alkyd resins, conventional acrylic resins free of the compound of the formula (I) as the component of the copolymer, etc.

In the preparation of the component (C), a radically polymerizable unsaturated monomer or monomers are polymerized in an organic liquid in the presence of the foregoing dispersion stabilizer resin to give a nonaqueous dispersion of polymer particles insoluble in the organic liquid.

Organic liquids for use in the polymerization include those in which the polymer particles produced by the polymerization are substantially insoluble but which are capable of dissolving well the stabilizer resin and the radically polymerizable unsaturated monomer(s). Specific examples of the organic liquid are aliphatic hydrocarbons such as hexane, heptane, octane, etc.; aromatic hydrocarbons such as benzene, toluene, xylene, etc.; alcohols such as methyl alcohol, isopropyl alcohol, n-butyl alcohol, isobutyl alcohol, octyl alcohol, etc.; ethers such as cellosolve, butyl cellosolve, diethylene glycol monobutyl ether, etc.; ketones such as methyl isobutyl ketone, diisobutyl ketone, methyl ethyl ketone, methyl hexyl ketone, ethyl butyl ketone, etc.; and esters such as ethyl acetate, isobutyl acetate, amyl acetate, 2-ethylhexyl acetate, etc. These organic liquids are usable singly or at least two of them can be used in mixture. These liquids are usually used as a mixture comprising a predominant amount of aliphatic hydrocarbon and a proper amount of aromatic hydrocarbon, alcohol, ether, ketone, ester or the like.

Radically polymerizable unsaturated monomers to be preferably polymerized are those which are highly polymerizable and which have a fewer number of carbon atoms than the monomer used for the dispersion stablizer resin. These monomers are readily formed into dispersed polymer particles. Examples of such radically polymerizable unsaturated monomers are $C_{1-18}$ alkyl or cycloalkyl esters of (meth)acrylic acids such as methyl (meth)acrylate, ethyl (meth)acrylate, propyl (meth) acrylate, n-butyl (meth)acrylate, isobutyl (meth) acrylate, tert-butyl (meth)acrylate, 2-ethylhexyl (meth) acrylate, cyclohexyl (meth)acrylate, n-octyl (meth) acrylate, lauryl (meth)acrylate, tridecyl (meth) acrylate, stearyl (meth)acrylate and the like; alkoxylalkyl esters of (meth)acrylic acids such as methoxybutyl (meth)acrylate, methoxyethyl (meth)acrylate, ethoxybutyl (meth)acrylate and the like; esters of aromatic alcohols with (meth)acrylic acids such as benzyl (meth)acrylate; adducts of glycidyl (meth)acrylate with $C_{2-18}$ monocarboxylic acid compounds such as acetic acid, propionic acid, oleic acid, p-tert-butylbenzoic acid or the like; adducts of (meth)acrylic acids with monoepoxy compounds such as "Cardura E-10" (trademark); aromatic vinyl compounds such as styrene, amethyl styrene, vinyl toluene, p-chlorostyrene, p-tertbutylstyrene and the like; monoesters or diesters of α,β-unsaturated carboxylic acids other than (meth)acrylic acids such as itaconic acid, itaconic anhydride, crotonic acid, maleic acid, maleic anhydride, fumaric acid, citraconic acid or the like with $C_{1-18}$ monohydric alcohols such as methyl alcohol, butyl alcohol, hexyl alcohol, stearyl alcohol or the like; fluorine-containing compounds such as "VISCOAT 8F", "VISCOAT 8FM", "VISCOAT 3F" and "VISCOAT 3FM" (trademarks, (meth)acrylates with fluorine atoms in the side chain manufactured by Osaka Organic Chemical Industry Ltd.), perfluorocyclohexyl (meth)acrylate, perfluorohexylethylene, etc.; (meth)acrylonitrile and like cyano-containing unsaturated compounds; vinyl esters such as vinyl acetate, vinyl benzoate, "VEOVA" (tradename, product of Shell Chemicals Ltd.), etc.; vinyl ethers such as n-butyl vinyl ethers, ethyl vinyl ethers, methyl vinyl ethers and the like; polyvinyl compounds such as 1,6-hexanediol di(meth)acrylate, trimethylolpropane tri-(meth)acrylate, divinyl benzene and the like; and α-olefin compounds such as ethylene, propylene, vinyl chloride, vinylidene chloride and the like. When the monomers used as the components for polymer particles have fewer carbon atoms than the monomer components for the dispersion stabilizer resin, the components can be stably formed into polymer particles, as described above. Monomers which are preferable to use from this viewpoint are (meth)acrylates which have 8 or less, preferably 4 or less, carbon atoms, aromatic vinyl compounds, (meth)acrylonitriles and the like.

These radically polymerizable unsaturated monomers are usable singly or at least two of them can be used in mixture.

A radical polymerization initiator is usually used in the polymerization of the radically polymerizable unsaturated monomer(s). Usable radical polymerization initiators are 2,2'-azobisisobutyronitrile, 2,2'-azobis(2,4-dimethylvaleronitrile) and like azo-type initiators, benzoyl peroxide, lauryl peroxide, tert-butyl peroctoate, tert-butylperoxy-2-ethylhexanoate and like peroxides, etc. These polymerization initiators are used in an amount of about 0.2 to about 10 parts by weight, preferably about 0.5 to about 5 parts by weight, per 100 parts by weight of the monomers to be polymerized. The amount of the dispersion stabilizer resin to be used in the polymerization can be selected from a wide range according to the kind of resins used and other factors. The radically polymerizable unsaturated monomer(s) is used in an amount of about 3 to about 240 parts by weight, preferably about 5 to about 82 parts by weight, per 100 parts by weight of the dispersion stabilizer resin. The total concentration of the dispersion stabilizer resin and the radically polymerizable unsaturated monomer(s) in the organic liquid is about 30 to about 70% by weight, preferably about 30 to about 60% by weight.

The polymerization can be conducted by a known method. A suitable reaction temperature for the polymerization is generally in the range of about 60° to about 160° C. and the reaction is completed usually in about 1 to about 15 hours.

In this way, a stable nonaqueous dispersion is obtained in which the liquid phase is a dispersion stabilizer resin as dissolved in an organic liquid and the solid phase is polymer particles prepared by the polymerization of a radical polymerizable unsaturated monomer. The particle size of the polymer particles is generally in the range of about 0.1 to about 1.0 μm. Use of polymer particles having a particle size smaller than said range leads to the increase of the viscosity of the varnish, whereas a particle size of the particles larger than said range results in the swelling or agglomeration of the particles during the storage, hence undesirable.

The component (C) for the composition of the present invention can be further improved in storage stability and mechanical characteristics by binding together the dispersion stabilizer resin and the polymer particles in the nonaqueous dispersion. When the dispersion stabilizer resin and the polymer particles are bound together, substantially no change is found in the appearance of the state of dispersion and the particle sizes of the polymer particles are within the above range.

The dispersion stabilizer resin and the polymer particles can be bound together by, for example, partially copolymerizing a monomer component having a functional group such as hydroxyl group, acid group, anhydrous acid group, epoxy group, methylol group, isocyanate group, anide group, amino group or the like in the step of proaucing the dispersion stabilizer resin and using, as a monomer component for forming the polymer particles, a monomer having a functional group reactive with the foregoing functional group, such as hydroxyl group, acid group, anhydrous acid group, epoxy group, methylol group, isocyanate group, amide group, amino group, etc. Examples of suitable combinations of the functional groups are isocyanate group and hydroxyl group, isocyanate group and methylol group, epoxy group and (anhydrous) acid group, epoxy group and amino group, isocyanate group and amide group, (anhydrous) acid group and hydroxyl group, etc.

Monomers having such functional group include, for example, acrylic or methacrylic acid, crotonic acid, maleic acid, maleic anhydride, itaconic acid, itaconic anhydride, fumaric acid, citraconic acid and like α,β-ethylenically unsaturated carboxylic acid; glycidyl acrylate or methacrylate, vinyl glycidyl ether, allyl glycidyl ether and like glycidyl group-containing compound; acrylamide or methacrylamide, N,N-dimethyl acrylamide or methacrylamide, N-alkoxymethylated acrylamide or methacrylamide, diacetone acrylamide, N-methylol acrylamide or methacrylamide and like carboxylic acid amide-type compound; p-styrene sulfonamide, N-methyl-p-styrene sulfonamide, N,N-dimethyl-p-styrene sulfonamide and like sulfonic acid amide group-containing compound; acrylic or methacrylic acid-tert-butylaminoethyl and like amino group-containing compound; condensates of 2-hydroxyethyl acrylate or methacrylate with phosphoric acid or phosphoric esters, addition products obtained by adding phosphoric acid or phosphoric esters to the glycidyl group of glycidyl group-containing compounds such as glycidyl acrylate or methacrylate and like phosphoric acid group-containing compounds; 2-acrylamide-2-methyl-propanesulfonic acid and like sulfonic group-containing compound; equimolar addition products of m-isopropenyl-α,α-dimethylbenzylisocyanate, isophorone diisocyanate or tolylene diisocyanate with hydroxy acrylate or methacrylate, isocyanoethyl methacrylate and like isocyanate group-containing compound; etc.

The dispersion stabilizer resin and the polymer particles can be bound together by another method, i.e. by polymerizing the radical polymerizable unsaturated monomer in the presence of a dispersion stabilizer resin having polymerizable double bond. The polymerizable double bond can be introduced into the dispersion stabilizer resin by, for example, using carboxylic acid, phosphoric acid, sulfonic acid or like acid group-containing monomer and reacting the acid group with glycidyl acrylate or methacrylate, allyl glycidyl ether or like glycidyl group-containing unsaturated monomer. Conversely, of course, such introduction can be conducted also by introducing glycidyl group into the resin and reacting the resin with an acid group-containing unsaturated monomer. These reactions can be carried out according to the conventional conditions.

The dispersion stabilizer resin and the polymer particles can be bound together by still another method, i.e. by preparing a nonaqueous dispersion comprising a dispersion stabilizer resin and polymer particles each of which has incorporated therein a functional group which is not reactive with each other, and then adding to the dispersion a binder for binding the functional groups. More specifically, for example, a hydroxyl group-containing unsaturated monomer or a mixture of this monomer and other unsaturated monomer is polymerized in the presence of a hydroxyl group-containing dispersion stabilizer resin and an organic liquid to prepare a nonaqueous dispersion comprising the dispersion stabilizer resin and the polymeric particles each of which has hydroxyl group incorporated therein. Thereafter, a polyisocyanate compound is added to the dispersion for reaction at ordinary temperature for several days, or at about 60° to about 100° C. for about 1 to about 5 hours, whereby the binding is completed. Examples of the polyisocyanate compound are any of those having at least one isocyanate group in the molecule, such as tolylene diisocyanate, xylylene diisocyanate, 4,4'-diphenylmethane diisocyanate and like aromatic diisocyanate or hydrogenated products of these; hexamethylene diisocyanate, lysinediisocyanate, dimer acid (dimer of fatty acid of tall oil) diisocyanate and like aliphatic diisocyanate; isophorone diisocyanate and like alicyclic diisocyanate; etc. In addition to the above combinations, also usable are the combinations of acid group-containing dispersion stabilizer resin, acid group-containing polymer particles and polyepoxide; epoxy group-containing dispersion stabilizer resin, epoxy group-containing polymer particles and polycarboxylic acid; epoxy or isocyanate group-containing dispersion stabilizer resin, epoxy or isocyanate group-containing polymer particles and polysulfide compound; etc. Useful polyepoxide includes, for example, bisphenol A epoxy resin, bisphenol F epoxy resin, novolak-type epoxy resin, epoxy group-containing acrylic resin and the like; examples of polycarboxylic acid are adipic acid, sebacic acid, azelaic acid, isophthalic acid and the like; usable polysulfide includes, for example, pentamethylenedisulfide, hexamethylenedisulfide, poly(ethylenedisulfide) and the like.

The dispersion stabilizer resin and the polymer particles can be chemically bonded together by the above methods. In this case, it is sufficient that at least 0.1 functional group or polymerizable double bond is introduced into the dispersion stabilizer resin and/or polymer particles on the average per molecule of the resin and/or particle.

A suitable amount of the hydroxyl group-containing unsaturated monomer in the dispersion stabilizer resin used in preparation of the component (C) for the composition of the present invention is, as stated above, about 1 to about 99% by weight based on the total amount of all the monomers used. When the hydroxyl group is to be reacted with the polymer particles, it is preferred to adjust, after the reaction, the amount of the hydroxyl group-containing unsaturated monomer component in the resin to 1 to 99% by weight based on the amount of the resin.

When the polymer particles obtained as a nonaqueous dispersion are thus used as the component (C) for the composition of the invention in combination with the acrylic polymer (A) and the amino resin (B), the mixing ratio of the component (C) can also be suitably selected as desired, but it is preferred to add to the components (A) and (B) the component (C) in the form of a dispersion in an amount of, based on the total resin content of the coating composition, 5 to 25% by weight, preferably 5 to 20% by weight, and more preferably 10 to 20% by weight.

Preferably, the coating composition of the present invention may have incorporated therein a catalyst for promoting the curing of alkoxysilane group when so required. Examples of such catalyst are acidic compounds such as p-toluenesulfonic acid, dodecylbenzenesulfonic acid., trichloroacetic acid, phosphoric acid, mono-n-propylphosphoric acid, monoisopropylphosphoric acid, mono-n-butylphosphoric acid, monoisobutylphosphoric acid, mono-tert-butylphosphoric acid, monooctylphosphoric acid, monodecylphosphoric acid and like monoalkylphosphoric acid, di-n-propylphosphoric acid, diisopropylphosphoric acid, di-n-butylphosphoric acid, diisobutylphosphoric acid, di-tert-butylphosphoric acid, dioctylphosphoric acid, didecylphosphoric acid and like dialkylphosphoric acid, phosphoric acid ester of $\beta$-hydroxyethyl acrylate or methacrylate, mono-n-propylphosphorus acid, monoisopropylphosphorus acid, mono-n-butylphosphorus acid, monoisobutylphosphorus acid, mono-tert-butylphosphorus acid, monooctylphosphorus acid, monodecylphosphorus acid and like monoalkylphosphorus acid, di-n-propylphosphorus acid, diisopropylphosphorus acid, di-n-butylphosphorus acid, diisobutylphosphorus acid, di-tert-butylphosphorus acid, dioctylphosphorus acid, didecylphosphorus acid and like dialkylphosphorus acid, etc.; tin-containing compounds such as tetraisopropyl titanate, tetrabutyl titanate, tin octylate, dibutyltin diacetate, dibutyltin dioctate, dibutyltin dilaurate, dibutyltin dimaleate, etc.; basic compounds such as butylamine, tert-butylamine, dibutylamine, hexylamine, ethylenediamine, triethylamine, isophoronediamine, imidazole, lithium hydroxide, sodium hydroxide, potassium hydroxide, sodium methylate, etc. At least one of these catalysts is used.

With respect to the curing catalyst, it is particularly interesting that when hexamethoxymethylmelamine or an etherified melamine resin which is obtained by partially or wholly substituting the methoxy group of hexamethoxymethylmelamine with an alcohol having four or more carbon atoms is used for the amino resin as the component (B), paratoluenesulfonic acid, dodecylbenzenesulfonic acid or like strong acid catalyst is generally used for the curing catalyst with the hydroxyl group. Further, such strong acid catalyst, when neutralized (blocked) with triethylamine, diethanolamine, 2-amino-2-methylpropanol or like amine compound, can be used while giving storage stability to the resulting coating composition of the one-pack type. In this case, the neutralized (blocked) strong acid catalyst serves also as a curing catalyst for the alkoxysilane group. In brief, at a baking temperature of 100° C. or higher, the neutralized (blocked) strong acid catalyst serves as a catalyst both for the reaction of the resin and for the reaction of the alkoxysilane. It is further interesting that since this neutralized (blocked) strong acid catalyst does not serve as a curing catalyst for alkoxysilane at ordinary temperatures, the storage stability of the coating composition of the one-pack type can be achieved under hermetically unsealed conditions, which is generally considered to be impossible in the curing system of alkoxysilane.

When required, the coating composition of the present invention is usable as, for example, a clear coating composition, solid color coating composition, metallic coating composition or the like by incorporating various known additives into the composition.

The coating composition of the present invention may have incorporated therein an organic and/or inorganic thixotropic agent; a silicon-based or like surface control agent; an ultraviolet absorbing agent; a light stabilizer; etc.

The solvents used for the conventional acrylic resin/melamine resin-based coating composition are all usable. Examples of such solvent are toluene, xylene, methyl ethyl ketone, ethyl acetate, dioxane, butanol and like organic solvent and water, etc. These solvents are each usable singly or at least two of them can be used in mixture.

The coating composition of the present invention can be coated, for example, by electrostatic coating, airspraying or like method. Coating apparatuses and coating facilities which have been conventionally employed are per se usable. The viscosity of the composition can be suitably determined depending on the coating apparatus, the kind of the solvent used, coating conditions and the like.

The coating composition of the present invention serves to give a coat which is outstanding in resistance to acids, scratches, staining, water, weather and the like and which is capable of maintaining the above properties for a prolonged period of time without deteriorating the appearance of the coat. Therefore the coating composition of the invention is suitable as a top coating composition for coating motor vehicles.

BEST MODE FOR CARRYING OUT THE INVENTION

The present invention will be described below in more detail with reference to the following Preparation Examples, Examples and Comparison Examples. In each example, "parts" and "percentages" are all by weight.

I. (A) Preparation Examples of acrylic polymer (1) (A-1)

| Styrene | 100 g |
|---|---|
| n-Butyl acrylate | 450 g |
| 2-Ethylhexyl methacrylate | 200 g |
| 2-Hydroxyethyl methacrylate | 150 g |
| γ-Methacryloxypropyltrimethoxysilane | 100 g |
| Azobisisobutyronitrile | 20 g |

A mixture of the above ingredients was added dropwise to the same quantity of xylene at 110° C. over a period of 3 hours and the resulting mixture was aged for 2 hours at the same temperature. The thus obtained transparent polymer had a number average molecular weight of 20000 as determined by GPC.

(2) (A-2)

| Methyl methacrylate | 150 g |
|---|---|
| n-Butyl methacrylate | 500 g |
| 1,4-Butanediol monoacrylate | 200 g |
| γ-Methacryloxypropyltrimethoxysilane | 150 g |
| Azobisisobutyronitrile | 20 g |

A mixture of the above ingredients was added dropwise to a solvent mixture of 500 g of xylene and 500 g of n-butanol at 120° C. over a period of 3 hours, followed by aging for 2 hours at the same temperature. The thus obtained transparent polymer had a number average molecular weight of 18000.

(3) (A-3)

| Styrene | 200 g |
|---|---|
| n-Butyl acrylate | 600 g |
| 2-Hydroxyethyl methacrylate | 200 g |
| Azobisisobutyronitrile | 20 g |

A mixture of the above ingredients was added dropwise to the same quantity of xylene at 120° C. over a period of 3 hours and the resulting mixture was aged for 2 hours at the same temperature. The thus obtained transparent polymer had a number average molecular weight of 18000.

II. (C) Preparation Examples of Non-aqueous Polymer Particles (1) Synthesis of dispersion stabilizer resin (N)

| Isobutyl acetate | 40 parts |
|---|---|
| Toluene | 40 parts |

A mixture of the above ingredients was refluxed with heating. To this mixture were added dropwise the following monomers and the polymerization initiator over a period of 3 hours, and thereafter the resulting mixture was aged for 2 hours.

| Methacryloxypropyltrimethoxysilane | 5 parts |
|---|---|
| Styrene | 10 parts |
| Isobutyl methacrylate | 49 parts |
| 2-Ethylhexyl methacrylate | 25 parts |
| 2-Hydroxyethyl methacrylate | 11 parts |
| 2,2'-Azobisisobutyronitrile | 2 parts |

The varnish of acrylic resin obtained was 55% in nonvolatile content and had a viscosity of G (Gardner, 25° C., the same conditions will be applied hereinafter) and a weight average molecular weight of 16000.

(2) Preparation of nonaqueous dispersion (N-1)

| Heptane | 93 parts |
|---|---|
| Varnish of 55% dispersion stabilizer resin (N) | 98 parts |

The above ingredients were placed into a flask and refluxed with heating. To the resulting mixture were added dropwise the following monomers and the polymerization initiator over a period of 3 hours, followed by aging for 2 hours.

| Styrene | 15 parts |
|---|---|
| Methyl methacrylate | 40 parts |
| Acrylonitrile | 30 parts |
| 2-Hydroxyethyl methacrylate | 15 parts |
| tert-Butylperoxy-2-ethylhexanoate | 1.5 parts |

The thus obtained nonaqueous dispersion was a milky, stable, low-viscous dispersion of polymer particles which was 53% in nonvolatile content, B in viscosity and 0.2 to 0.3 μm in particle size of the polymer particles (as measured by an electron microscope, such measurements will be conducted by the same apparatus hereinafter). Even when the dispersion was allowed to stand at room temperature for 3 months, neither precipitate nor coarse particle was found.

III. Examples and Comparison Examples

Example 1 Clear coating composition (D-1)

| Solution (A-1) | 140 parts |
|---|---|
| Cymel 303 (Note 1) | 30 parts |
| Nacure 5225 (Note 2) | 1.5 parts |
| Surface control agent (product of BYK-Chemie GmbH, BYK-300 solution) | 0.1 part |
| Ultraviolet absorbing agent (product of Ciba-Geigy Corp., Tinuvin 900) | 1.0 part |

A mixture of the above ingredients was diluted with Swasol #1000 to a viscosity of 25 sec (Ford cup #4, 20° C.). The solids content of the obtained coating composition was 45%.

(Note 1) Cymel 303: a fully methoxylated melamine resin manufactured by Mitsui-Cyanamid, Ltd.

(Note 2) Nacure 5225: a neutralized product of dodecylbenzene sulfonic acid with dimethyloxazolidine manufactured by KING INDUSTRIES INC.

Example 2 Clear coating composition (D-2)

| Solution (A-2) | 160 parts |
|---|---|
| Cymel 303 | 20 parts |
| Nacure 5225 | 2 parts |
| Surface control agent | 0.1 part |
| Ultraviolet absorbing agent | 1.0 part |

Using the above ingredients, the desired coating composition was prepared in the same manner as in preparation of the composition D-1. The coating composition had a solids content of 46%.

Example 3 Clear coating composition (D-3)

| Solution (A-2) | 140 parts |
|---|---|
| 60% U-VAN 20SE-60 (a butylated melamine manufactured by Mitsui Toatsu Chemicals Inc.) | 50 parts |
| Dibutyltin dilaurate | 0.5 part |
| Surface control agent | 0.1 part |
| Ultraviolet absorbing agent | 1.0 part |

Using a mixture of the above ingredients, a coating composition was prepared in the same manner as in preparation of composition D-1. The obtained coating composition had a solids content of 44%.

Comparison Example 1 Clear coating composition (D-4)

| Solution (A-3) | 140 parts |
|---|---|
| Cymel 303 | 30 parts |
| Nacure 5225 | 2 parts |
| Surface control agent | 0.1 part |
| Ultraviolet absorbing agent | 1.0 part |

Using a mixture of the above ingredients, a coating composition was produced in the same manner as in preparation of the composition D-1. The obtained coating composition had a solids content of 45%.

Comparison Example 2 Clear coating composition (D-5)

| Solution (A-1) | 80 parts |
|---|---|
| Cymel 303 | 60 parts |
| Dodecylbenzenesulfonic acid | 2 parts |
| Surface control agent | 0.1 part |
| Ultraviolet absorbing agent | 1.0 part |

Using a mixture of the above ingredients, a coating composition was produced in the same manner as in preparation of the composition D-1. The obtained coating composition had a solids content of 45%.

Example 4 Solid color coating composition (S-1)

| Titanium white JR-701 (titanium dioxide manufactured by Tayca Corporation) | 100 parts |
|---|---|
| Solution (A-1) | 140 parts |
| 60% U-VAN 20SE-60 (a butylated melamine resin manufactured by Mitsui Toatsu Chemicals, Inc.) | 50 parts |
| Dibutyltin dilaurate | 0.3 part |
| Surface control agent | 0.1 part |

A mixture of the above ingredients was diluted with Swasol #1000 to a viscosity (Ford cup No. 4) of 25 sec. The resulting coating composition had a solids content of 45%.

Example 5 Solid color coating composition (S-2)

| Titanium white JR-701 | 100 parts |
|---|---|
| Solution (A-2) | 140 parts |
| 60% U-VAN 20SE-60 | 50 parts |
| Surface control agent | 0.1 part |

Using a mixture of the above ingredients, a coating composition was prepared in the same manner as in production of the composition S-1. The obtained coating composition had a solids content of 44%.

Comparison Example 3 Solid color coating composition (S-3)

| Titanium white JR-701 | 100 parts |
|---|---|
| Solution (A-3) | 140 parts |
| 60% U-VAN 20SE-60 | 50 parts |
| Surface control agent | 0.1 part |

Using a mixture of the above ingredients, a coating composition was prepared in the same manner as in production of the composition S-1. The obtained coating composition had a solids content of 45%.

Example 6 Clear coating composition (DN-1)

| Solution (A-1) | 120 parts |
|---|---|
| Cymel 303 | 30 parts |
| Dispersion (N-1) | 18.8 parts |
| Nacure 5225 | 1.5 parts |
| Surface control agent | 0.1 part |
| Ultraviolet absorbing agent | 1.0 part |

Using a mixture of the above ingredients, a coating composition was prepared in the same manner as in production of the composition D-1. The obtained coating composition had a solids content of 55%.

Example 7 Solid color coating composition (SN-1)

| Titanium white JR-701 | 100 parts |
|---|---|
| Solution (A-1) | 120 parts |
| 60% U-VAN 20SE-60 | 50 parts |
| Dispersion (N-1) | 18.8 parts |
| Dibutyltin dilaurate | 0.3 part |
| Surface control agent | 0.1 part |

Using a mixture of the above ingredients, a coating composition was prepared in the same manner as in production of the composition S-1. The obtained coating composition had a solids content of 56%.

IV. Performance test results (1) Clear coating compositions

On a mild steel sheet treated with zinc phosphate were formed an electrodeposition coating film and an intercoat coating film. The following metallic coating composition was applied thereon (film thickness: 20 μm when cured) and allowed to stand for 5 minutes at room temperature. Each of the foregoing clear coating compositions D-1 to D-5 and DN-1 was applied thereon (film thickness: 40 μm when cured) and heated at 140° C. for 30 minutes to cure the beth coating films. Table 1 shows the results obtained by the performance tests of the obtained coating films together with the results obtained by the storage properties test of the coating compositions.

Metallic coating composition

| | |
|---|---|
| Acrylic resin (Acrydic 47-712 manufactured by Dainippon Ink And Chemicals, Incorporated) | 100 parts |
| Butylated melamine (U-VAN 20SE-60 manufactured by Mitsui Toatsu Chemicals, Inc.) | 60 parts |
| Aluminum paste (Alumipaste 55-519 manufactured by Toyo Aluminum K.K.) | 10 parts |

A mixture of the above ingredients was adjusted to 14 sec (Ford cup No. 4, 20° C.) using a solvent mixture of 30 parts of Swasol #1000 and 70 parts of toluene.

(2) Solid color coating compositions

On a mild steel sheet treated with zinc phosphate on which an electrodeposition coating film and an intercoat coating film were formed in the same manner as above was applied each of the foregoing solid color coating compositions S-1 to S-3 and SN-1 (film thickness: 40 μm when cured). The coated steel panel was heated at 140° C. for 30 minutes to cure the coating composition. Table 1 shows the results obtained by testing the coating films obtained above for the performance, together with the results obtained by testing the coating compositions for the storage properties. The test methods were as follows. Acid resistance: Half of the whole area of the test panel was immersed in 40% aqueous solution of sulfuric acid and allowed to stand at 50° C. for 5 hours. Thereafter the test panel was washed with water, and the surface thereof was observed and evaluated according to the following criteria (provided that the test panels coated with DN-1 and SN-1, respectively were immersed in the solution at 50° C. for 10 hours):

A: No change was found
B: No change was found on the surface of the test panel, but there was a small difference in level on the boundary between the immersed portion and the non-immersed portion
C: Blushing was found on the surface of the test panel Adhesion of additional coating: Each test specimen was baked at 160° C. for 30 minutes. The same overcoating composition (base coat/clear coat in the case of metallic coating) was applied thereon and the coated panel was baked at 140° C. for 30 minutes. Thereafter, the coating surface=was cut crosswise to form 100 squares each having a size of 1 mm×1 mm. A cellophane adhesive tape was applied on the cut surface and peeled therefrom. This property was evaluated in terms of the number of the peeled squares.
A: No square was peeled
B: A slight number of squares were peeled
C: A great number of squares were peeled Impact resistance: Test panel was tested for impact resistance with use of a DuPont impact tester equipped with an impact rod having a tip ½ inch in radius and with a falling weight to be dropped weighing 500 g. Impact resistance was evaluated in terms of the maximum height at which no cracking was formed on the coating surface (the falling weight was dropped at 5-cm intervals). Resistance to stains: A small quantity of dust (type 15, JIS Z 8901) was sprinkled over the surface of the test panel and the surface thereof was rubbed with a soft cloth 10 times, washed with water and subjected to air-drying. The surface was wiped with a cloth impregnated with ethyl alcohol, and the test panel was evaluated for the degree of staining.
A: No staining was found
B: A slight degree of staining was found
C: A marked degree of staining was found Water resistance: The test panel was immersed in warm water maintained at 40° C. for 240 hours and washed with water. The coating surface was observed and the test panel was evaluated for water resistance according to the following criteria:
A: No change was found
B: A slight degree of dulling was found
C: Blushing was found on the coating surface Appearance of coating film: Evaluated with the unaided eye Storage properties of the coating composition: A 300 g quantity of a diluted coating composition (Ford cup No. 4, 25 sec) was placed into a beaker and the beaker was lightly covered with a piece of aluminum foil. The coating composition was stirred at room temperature for 48 hours and the viscosity of the composition (Ford cup No. 4) was determined to check the degree of the thickening.
A: Less than 28 sec
B: Less than 38 sec
C: 38 sec or higher

TABLE 1

| | Example | | | Comp. Ex. | | Example | | Comp. Ex. | Example | |
|---|---|---|---|---|---|---|---|---|---|---|
| Coating comp. No. | D-1 | D-2 | D-3 | D-4 | D-5 | S-1 | S-2 | S-3 | DN-1 | SN-1 |
| Acid resistance | A | A | A | C | A | A | A | C | A | A |
| Adhesion of additional coating | A | A | A | A | B | A | A | B | A | A |
| Impact resistance | 40 | 50 | 45 | 40 | 10 | 45 | 50 | 30 | 55 | 55 |
| Resistance to stains | A | A | A | B | A | A | A | B | A | A |
| Water resistance | A | A | A | B | B | A | A | B | A | A |
| Appearance of coating | A | A | A | A | B | A | A | A | A | A |

TABLE 1-continued

| Coating comp. No. | Example | | | Comp. Ex. | | Example | | Comp. Ex. | Example | |
|---|---|---|---|---|---|---|---|---|---|---|
| | D-1 | D-2 | D-3 | D-4 | D-5 | S-1 | S-2 | S-3 | DN-1 | SN-1 |
| film | | | | | | | | | | |
| Storage properties of coating composition | A | A | B | A | C (Gelation) | B | A | A | A | A |
| Solids content of the coating composition (%) | 45 | 46 | 44 | 45 | 45 | 45 | 44 | 45 | 55 | 56 |

We claim:

1. An automotive top coating composition, comprising as the main components:
   (A) an acrylic polymer prepared by copolymerizing
   (a) 5 to 40% by weight of a alkoxysilane-containing vinyl monomer which is a compound represented by the formula

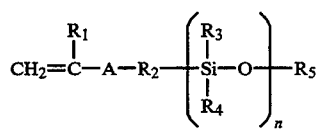 (I)

wherein A is

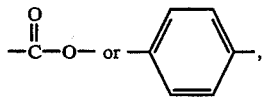

$R_1$ is a hydrogen atom or a methyl group, $R_2$ is a bivalent aliphatic saturated hydrocarbon group having 1 to 6 carbon atoms, $R_3$ and $R_4$ are the same or different and are each a phenyl group, an alkyl group having 1 to 6 carbon atoms or an alkoxy group having 1 to 10 carbon atoms, $R_5$ is an alkyl group having 1 to 10 carbon atoms, and n is an integer of 1 to 100,
   (b) 5 to 50% by weight of a hydroxyl-containing vinyl monomer, and
   (c) 10 to 90% by weight of another vinyl monomer which is copolymerizable with the above vinyl monomers, at least one of the monomers (a), (b) and (c) being an acrylic monomer,
   (B) an amino resin in amount of 5 to 50% by weight based on the total mount of resin solids in the coating composition,
   (C) a nonaqueous particulate polymer prepared by polymerizing a radically polymerizable unsaturated monomer or monomers in an organic liquid, wherein the resulting polymer is insoluble, in the presence of a dispersion stabilizer resin which is a copolymer prepared from the alkoxysilane-containing vinyl monomer of the formula (I) in the presence of a hydroxyl-containing unsaturated monomer, and
   (D) a curing catalyst.

2. A coating composition according to claim 1 wherein the amino resin is a hexamethoxymethyl melamine and/or an etherified melamine having methoxymethyl groups which have been partially or wholly replaced by an alcohol of 4 or more carbon atoms.

3. A coating composition according to claim 1 wherein the component (C) is used in an amount of 5 to 25 % by weight based on the total amount of the resin solids in the coating composition.

* * * * *